US009806987B2

(12) United States Patent
Avci et al.

(10) Patent No.: US 9,806,987 B2
(45) Date of Patent: Oct. 31, 2017

(54) METHOD AND APPARATUS FOR REDUCING RESPONSE TIME IN INFORMATION-CENTRIC NETWORKS

(71) Applicant: Futurewei Technologies, Inc., Plano, TX (US)

(72) Inventors: Serhat Nazim Avci, Sunnyvale, CA (US); Cedric Westphal, San Francisco, CA (US)

(73) Assignee: Futurewei Technologies, Inc., Plano, TX (US)

( * ) Notice: Subject to any disclaimer, the term of this patent is extended or adjusted under 35 U.S.C. 154(b) by 159 days.

(21) Appl. No.: 14/814,177

(22) Filed: Jul. 30, 2015

(65) Prior Publication Data

US 2016/0036689 A1    Feb. 4, 2016

Related U.S. Application Data (60) Provisional application No. 62/030,908, filed on Jul. 30, 2014.

(51) Int. Cl.
*H04J 1/16* (2006.01)
*H04L 12/727* (2013.01)
(Continued)

(52) U.S. Cl.
CPC ........ *H04L 45/121* (2013.01); *H04L 43/0894* (2013.01); *H04L 43/0852* (2013.01); *H04L 45/125* (2013.01); *H04L 45/38* (2013.01)

(58) Field of Classification Search
CPC ........ H04L 43/0852; H04L 43/0876–43/0894; H04L 45/121; H04L 45/125; H04L 45/38; H04L 45/124; H04L 45/123
See application file for complete search history.

(56) References Cited

U.S. PATENT DOCUMENTS 6,542,468 B1 *  4/2003  Hatakeyama ....... H04L 63/0281
                                                        370/238
2006/0075191 A1   4/2006  Lolayekar et al.
(Continued)

FOREIGN PATENT DOCUMENTS

WO      2014074802 A1    5/2014

OTHER PUBLICATIONS

International Search Report and Written Opinion dated Nov. 2, 2015 in International Patent Application No. PCT/US2015/042959, 7 pages.

(Continued)

*Primary Examiner* — Kan Yuen
(74) *Attorney, Agent, or Firm* — Vierra Magen Marcus LLP (57) ABSTRACT

A method for reducing response times in an information-centric network includes receiving an indication from an ingress node of a content object entering a network, the content object associated with a new delivery flow through the network. An egress node in the network for the content object and a size of the content object are identified. A backlog and bandwidth for the new delivery flow is determined based in part on the size of the content object. Backlogs and bandwidths for existing delivery flows in the network are determined. A set of candidate paths in the network for the new delivery flow from the ingress node to the egress node is determined. For each candidate path, a total response time is estimated for completion of all delivery flows for each candidate path based on the backlog and bandwidth. The candidate path having the lowest total response time is selected for the new delivery flow.

20 Claims, 8 Drawing Sheets

(51) Int. Cl.
*H04L 12/26* (2006.01)
*H04L 12/729* (2013.01)
*H04L 12/721* (2013.01)

(56) References Cited

U.S. PATENT DOCUMENTS

| | | |
|---|---|---|
| 2010/0182907 A1 | 7/2010 | Pinter et al. |
| 2013/0322256 A1 | 12/2013 | Bader et al. |
| 2014/0032714 A1 | 1/2014 | Liu et al. |
| 2015/0071108 A1* | 3/2015 | Lumezanu ............ H04L 43/106 370/253 |

OTHER PUBLICATIONS

B. Fortz and M. Thorup, "Internet Traffic Engineering by Optimizing OSPF Weights", INFOCOM 2000, Nineteenth Annual Joint Conference of the IEEE Computer and Communications Societies, Proceedings, IEEE, vol. 2, pp. 519-528 vol. 2, 2000.

Y. Zhang, "Abilene traffic matrices", http://www.cs.utexas.edu/~yzhang/research/AbileneTM/ (2004).

* cited by examiner

METHOD AND APPARATUS FOR REDUCING RESPONSE TIME IN INFORMATION-CENTRIC NETWORKS

RELATED APPLICATIONS

This application claims the benefit of U.S. Provisional Application No. 62/030,908 filed Jul. 30, 2014, which is hereby incorporated by reference herein.

TECHNICAL FIELD

The present disclosure relates in general to packet transport in an information-centric network and more particularly to a method and apparatus for reducing response time in information-centric networks.

BACKGROUND

Congestion in the network causes packet drops and high queuing delays, increasing latency and flow completion times. As an example, a company may lose 1% of sales for every 100 ms of extra latency. An extra 0.5 s latency in page generation may decrease web traffic by 20%. Typical mechanisms rely on historical and probabilistic methods. Historically, a traffic matrix is created and weights are assigned to paths to minimize Maximum Link Utilization (minMLU). Probabilistically, these link utilization graphs are expected to converge to optimal values but such convergence may occur too late to ease congestion with changing network resource allocations. Certain efforts only detect for big, or 'elephant' sized, flows in data center networks and prevent their collision on the same path. Other techniques use heuristics to include content-based differentiation and rely on historical data. Hash-based load balancing between equal shortest paths is another attempt at reducing congestion in the network. An IP flow matching a certain source/destination filter may encompass different applications. Moreover, an IP flow is a poor descriptor of the amount of resources to allocate. In addition, there is no explicit semantics to signal the end of a flow.

Better traffic engineering and resource allocation mechanisms are needed in the network to reduce congestion and hence completion time of flows. The current internet architecture is ill-suited for this purpose.

SUMMARY

From the foregoing, it may be appreciated by those skilled in the art that a need has arisen for a technique to reduce congestion in a network, especially in an information-centric network. In accordance with the present disclosure, a method and apparatus for reducing response time in an information-centric network are provided that greatly reduce or substantially eliminate problems and disadvantages associated with current network congestion reduction techniques.

According to an embodiment of the present disclosure, a method for reducing response times in an information-centric network is provided that includes receiving an indication from an ingress node of a content object entering a network, the content object associated with a new delivery flow through the network. An egress node in the network for the content object and a size of the content object are identified. A backlog and bandwidth for the new delivery flow is determined based in part on the size of the content object. Backlogs and bandwidths for existing delivery flows in the network are determined. A set of candidate paths in the network for the new delivery flow from the ingress node to the egress node is determined. For each candidate path, a total response time is estimated for completion of all delivery flows for each candidate path based on the backlog and bandwidth. The candidate path having the lowest total response time is selected for the new delivery flow.

The present disclosure describes many technical advantages over conventional network congestion reduction techniques. For example, one technical advantage is to identify a path through the network for a content object that has the least impact on existing content delivery flows within the network. Another technical advantage is to provide bandwidth sharing under the control of a controller in the network in identifying the candidate path. Yet another technical advantage is the gain in response time as compared to conventional techniques. Other technical advantages may be readily apparent to and discernable by those skilled in the art from the following figures, description, and claims.

BRIEF DESCRIPTION OF THE DRAWINGS

For a more complete understanding of the present invention and the advantages thereof, reference is now made to the following description taken in conjunction with the accompanying drawings, wherein like reference numerals represent like parts, in which.

DETAILED DESCRIPTION

FIGS. 1 through 11, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Features shown and discussed in one figure may be implemented as appropriate in one or more other figures.

An information-centric network (ICN) supports flows initiated by a request for content from a consumer of the content. The consumer may be inside the network or in a different network domain. The network receives the request and the content flows back through the network. A content object is mapped to a single flow and all chunks composing one content object are allocated to the same path through the network. ICNs may support delivery of the chunks from multiple sources, but for discussion purposes it is assumed that all chunks follow the same path.

If a strict path symmetry is enforced, the traffic allocation decision can be made on the request. Namely, if a customer sends a CCN/NDN interest packet identifying a content object, path selection may be performed by routing the interest packet over the desired path for the content to the location hosting the data. However, for discussion purposes, a content-based routing decision to deliver the content to the requester is made by the network upon a content flow entering the network either from a host directly attached to the network or from a different domain.

Content is uniquely associated with its identifier (e.g., in an ICN, by name), and the content size is associated with this identifier as well. Any conventional mechanism may be used to create a mapping of the content name to its size.

More formally, a network graph G=(N, E) is considered with N being the set of nodes and E being the set of links. Each individual link e has capacity $c_e$. Each content (or flow) $z_{s,d}$ entering the network at vertex (source) s and leaving at vertex (destination) d can select a path $P^k_{s,d}$ from a set of $K_{s,d}$ distinct paths ($P^k_{s,d}$, k=1; : : : ; $K_{s,d}$), where a path is an acyclic sequence of links e in the set of links E going from u to v. If link e belongs to path $P^k_{s,d}$ for some s, d, k, we say that $e \in P^k_{s,d}$ $K_{s,d}$ is assumed to be relatively low to simplify the allocation decision and the management complexity. In an example evaluation, $K_{s,d}$ ranges from 3 to 5.

According to classical networking models, traffic flows from s to d are generated for test purposes according to a Poisson process with rate $\lambda_{s,d}$, though the present disclosure is applicable to any type of traffic. Since each flow corresponds to a piece of content and since the network has access to the content size, the network has access to the flow size (which is also denoted by z) upon arrival of a flow z in the network. The size z may be drawn from a known distribution (that of the distribution of the content size which can be empirically measured) with mean $\bar{z}$. The response time of the network for flow z is defined as the time between the first arrival of the first chunk of z at the ingress of the network until the last departure from the last chunk of flow z at the egress of the network.

The amount of traffic under the arrival rate $\lambda_{s,d}$ and the distribution for z are assumed to be stable and can be allocated to the paths $P^k_{s,d}$ in a manner such that the load allocated to each link e is less (on average) than this link's capacity. Namely, coefficients $\pi^k_{s,d}$, 1, : : : ; $K_{s,d}$ with $0 \leq \pi^k_{s,d} \leq 1$ and $\Sigma_k \pi^k_{s,d}=1$ exist such that the link utilization $u_e$ of link e satisfies the following feasibility condition:

$$\forall e \in E, u_e = \Sigma_{Pks,d: e \in Pks,d} \lambda_{s,d} \pi^k_{s,d} \bar{z} < c_e \quad (1)$$

Note that the matrix $\{\bar{z}\lambda_{s,d}\}_{(s,d) \in V \times V}$ corresponds to the traffic matrix in the network, and the $\pi^k_{s,d}$ corresponds to a static traffic engineering decision. For instance, a possible traffic engineering policy could be to randomly split the flows arriving from s to d with probability $\pi^k_{s,d}$ onto the $K_{s,d}$ possible paths $P^k_{s,d}$. The term minMLU denotes the random splitting policy where the choice of coefficient $\pi^k_{s,d}$ minimizes $\max_{e \in E} u_e$. This is the typical min-MLU traffic engineering policy which minimizes the Maximum Link Utilization.

One important aspect is that only the path of the objects through the network is modified, but not the amount of traffic that is offered to the network. Therefore, if there is a solution to Equation 1, the network will be stable (i.e., able to deliver all the traffic), and the link utilization of all policies which keep the network stable will be the same. The goal of the present disclosure is not to improve link utilization, but to reduce the delay to deliver a flow (or equivalently, by Little's Theorem, the number of flows in progress at any given time).

Another key aspect is that of the number of flows being considered at a given time. For an extremely large number of flows, the probabilistic splitting of the flows according to the coefficient $\pi_s sd^k$ will yield a result which converges to Equation 1 by the central limit theorem. This means that the link utilization in such a case will be close to optimal. Further, for a very large number of flows, the resource allocation needs to be kept simple to keep up with the speed. However, for smaller scales and with heavy tail flow size distribution, the probabilistic resource allocation will have worse results (as will be shown below in the evaluation).

Current networks fall short of enabling this vision. IP flows are difficult to properly define, since a sequence of packets matching an IP header filter with no interruption longer than a given time-out can incorporate multiple distinct contents, applications, or even users. Fine grained resource allocation creates a host of requirements on the underlying networks and on the mechanisms used to provide the allocation. Current networks do not support such mechanism, for lack of the proper tools and abstractions. Four requirements are contemplated in performing resource allocation in a network—content-based abstraction, content-based control plane, traffic estimation, and scalability.

For content-based abstraction, in order to perform a fine grained resource allocation, the network layer needs to be able to uniquely identify each flow and to be able to distinguish different content and users. Current IP architecture has been evolving towards a control plane which performs per-flow decisions. As a new flow enters the network, a rule is applied that is set by the controller. As content specific traffic engineering is desired to be achieved, such a mechanism may be extended to apply to content.

The control plane of the network extends to the edge and is able to make a routing decision once for each piece of content (or a subset thereof). The decision can be as simple as assigning a tag (such as an MPLS label) at the ingress edge, so that the flow follows a given path through the network fabric until it reaches the egress edge. The control plane also needs to be aware of the congestion in the network fabric to make a proper path selection. For this, a network monitoring infrastructure is utilized to keep track of the amount of traffic allocated to the nodes' outgoing links. Namely, when a flow $z_{s,d}$ with size z is allocated to the k-th path $P^k_{s,d}$, it will add z to the backlog of the edges traversed by path $P^k_{s,d}$. For the nodes monitoring the congestion, a description of the flows and remaining backlogs is required. Though designed to consider all flows through a network in order to reduce the response time in the network, a policy may be implemented that ignores all flows below a certain threshold and focuses on identifying only elephant flows for resource allocation. From the knowledge of the flows assigned to paths, the traffic assignment mechanism is to be able to derive some behavior of the forwarding plane.

For traffic estimation, the control plane needs to be aware of the behavior of the forwarding plane under given flow conditions. TCP is an end-to-end protocol which makes the forwarding behavior inside the network (for example, reaction to congestion) contingent to a policy at the end point. In order to properly assign resources, the control plane is designed to understand the impact of its decisions on the flows and have a model of the TCP behavior (either a theoretical model or an empirical model based upon previously observed network conditions). One potential approach for this is to have the control plane control this TCP behavior. This goes against current approach where the control of the transport layer is delegated to the end points of the transmission.

Any resource allocation policy has to scale up with the size of the network. For large scales, a probabilistic approach will approach the optimal. Two tiers of policy may be implemented—a probabilistic minMLU mechanism in the core and a dynamic allocation at the edge. This two tier policy provides flexibility to handle networks of different scales.

Figure 1:
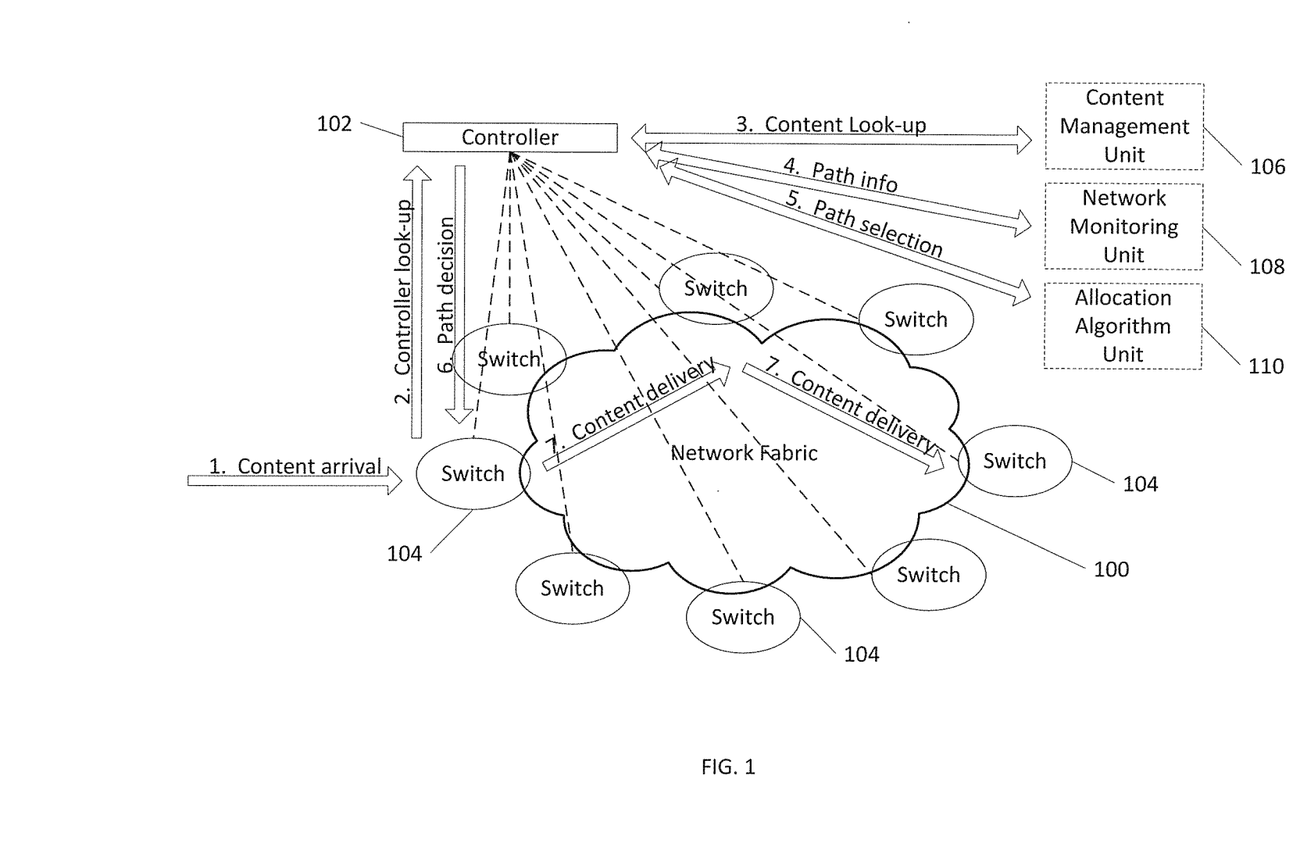
FIG. 1 illustrates a network implementing a content-based traffic allocation mechanism.

FIG. 1 shows the elements in a network 100 implementing a content-based traffic allocation mechanism which meets the requirements provided above. Network 100 uses an ICN protocol that names content so that a content object is uniquely identified by its name. A centralized controller 102, either physically or logically, makes content-based decisions at the edge of the network 100. The edge entities are typically one or more nodes/switches 104 connected to the controller 102.

The controller 102 includes a content management unit 106, a network monitoring unit 108, and an allocation algorithm unit 110 for use in selecting a path through the network 100 for a content object by either setting a rule at the nodes/switches 104 in the network 100 or by assigning a label for a pre-computed path. The controller 102 may be implemented as an extension of OpenFlow. The mapping of the content name to its size is straightforward.

The content management unit 106 maps the content to a location in a cache in the network 100 or to an egress path out of the network 100, monitors content information such as identifying the content size, and keeps a database of the mapping of the content to its size.

The network monitoring unit 108 maintains a view of the conditions inside the network 100 by polling the nodes/switches 104 for network conditions, by estimating the conditions from the input and the predicted network evolution, or a combination of both.

The allocation algorithm unit 110 decides which of the candidate paths for a (source, destination) pair will provide the best network performance based upon the input of the content management unit 106 and the network monitoring unit 108.

Figure 2:
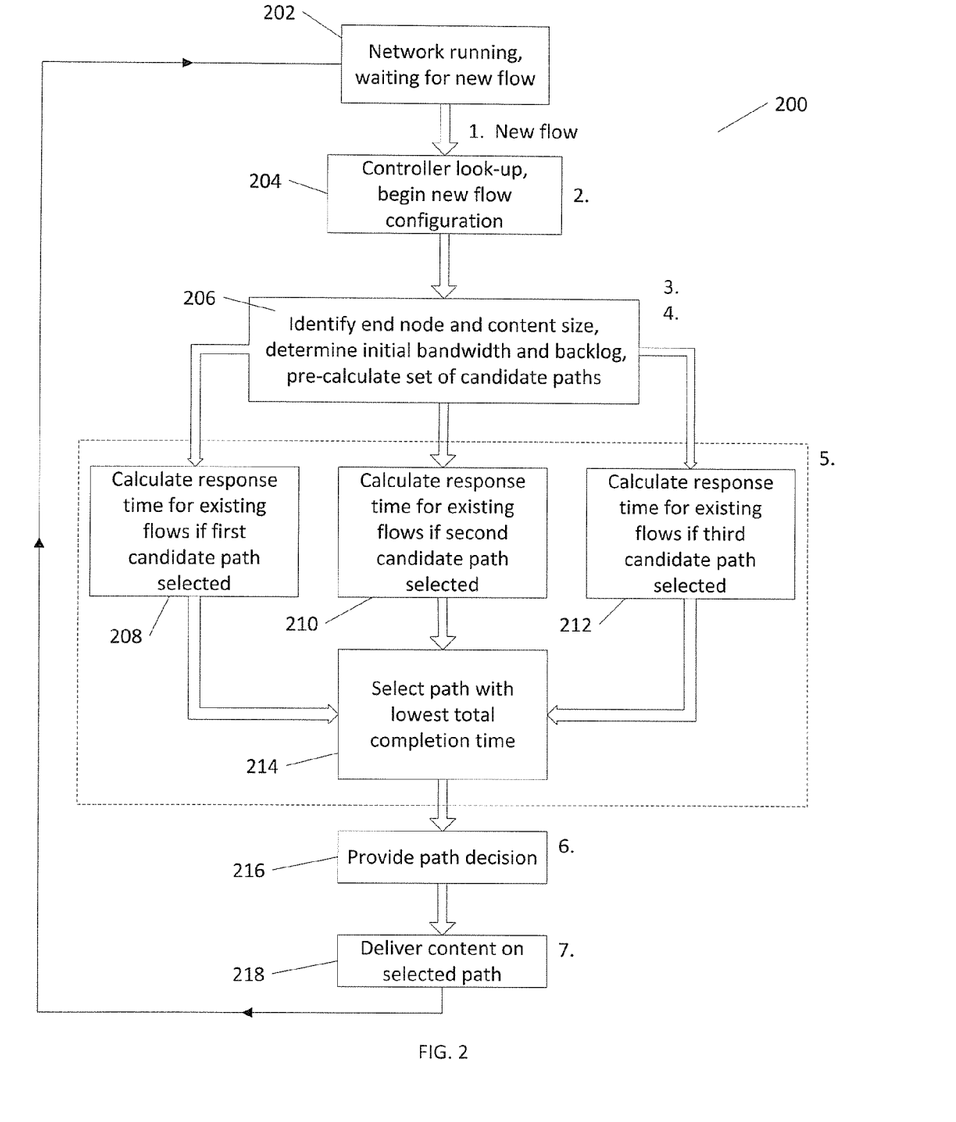
FIG. 2 illustrates a simplified process for performing path selection in the network.

FIG. 2 shows a simplified process 200 for performing path selection provided in network 100. Process 200 begins at block 202 where the network is running and waiting for a new flow to be received. Upon receiving content for a new flow, ingress node/switch 104 performs a look-up operation at block 204 to find controller 102 and configuration of the new flow is initiated. At block 206, the destination end node 104 in network 100 is identified by content management unit 106, an initial bandwidth and backlog are determined by network monitoring unit 108, and candidate paths are calculated by allocation algorithm unit 110. For each candidate path, a response time for the existing flows is calculated for that particular path by allocation algorithm unit 110 in blocks 208, 210, and 212. Process 200 is shown with three candidate paths to be evaluated, though any number of candidate paths may be included in performing these calculations. Allocation algorithm unit 110 selects the path with the lowest total completion time at block 214. The path decision is provided to ingress node/switch 104 at block 216. Ingress node/switch 104 delivers the content on the selected path at block 218. Process 200 returns to block 202 to await receipt of a new flow.

Figure 3:
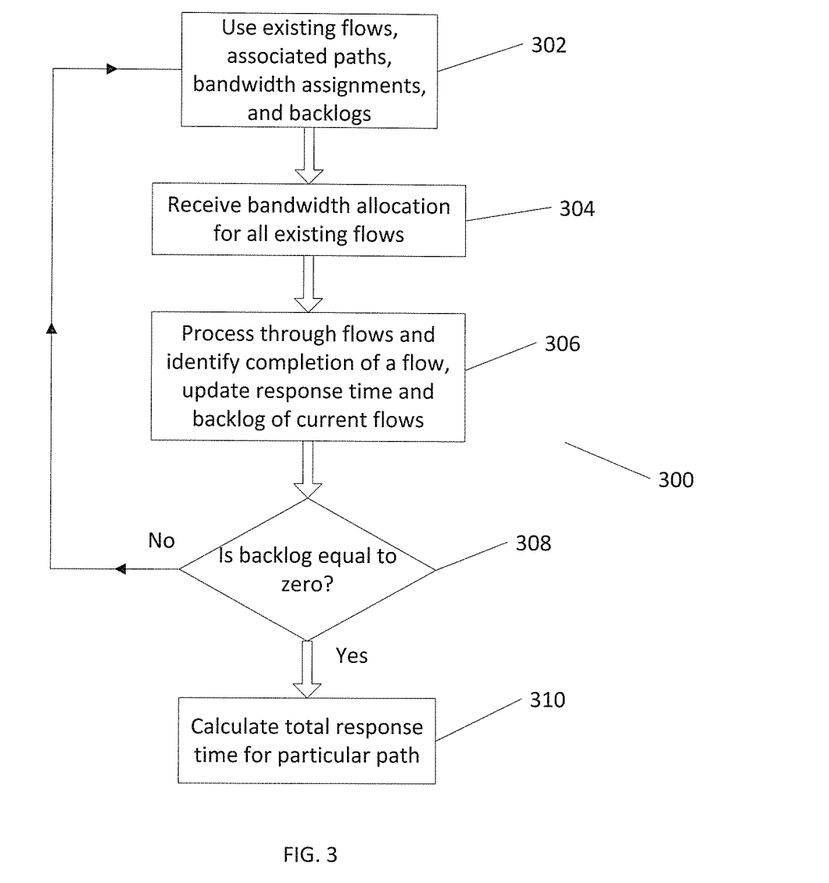
FIG. 3 illustrates a simplified process for evaluating a particular candidate path in the path selection process.

FIG. 3 shows a simplified process 300 performed by allocation algorithm unit 110 for a particular candidate path. Process 300 begins at block 302 where allocation algorithm unit 110 uses the existing flows, associated paths, bandwidth assignments, and backlogs. At block 304, allocation algorithm unit 110 receives a bandwidth allocation for all existing flows. At block 306 each flow is processed until a flow has completed. Upon completion of a flow, the response time and backlog of remaining flows are updated. At block 308, a determination is made as to whether the total remaining backlog has reached zero. If not, process 300 returns to block 302 to iterate through the remaining flows. Upon processing all of the backlogs to zero, a total response time is calculated at block 310 for comparison of other total response times of other candidate paths at block 214 of FIG. 2.

A Minimum Response Time Policy (MRTP) provided in process 300 is based on the following parameters and functions. A parameter $z_i$ denotes the ith content to be transferred in the network as well as its size in bytes. For each point-to-point content transfer from a source s∈all sources S to a destination d∈all destinations D, a backlog function $B_{zi}(t)$ is associated with each content transfer denoting the backlog generated by the content $z_i$ from s to d at time t. Letting $t_{zi}$ be the arrival time of content $z_i$, then $B_{zi}(t)$ is a non-increasing function of t for t∈[$t_{zi}$,+∞) that diminishes from the size of the content, $z_i$ down to 0. For instance, if considering a flow using the full capacity c of a link, then $B_{zi}(t)$ can be given as the following:

$$B_{zi}(t)=[z_i-c(t-t_{zi})]^+ \quad (2)$$

where $[g]^+=\max\{g, 0\}$. In general, due to the dynamics of the flow interactions and of the transport protocol (for example, TCP), it is easier to compute $B_{zi}(t)$ at each link by subtracting the volume of content that has traversed the link from the original content size. $B_{zi}(t)$ corresponds to the unfinished, remaining amount for the flow $z_i$. Note that this backlog is not inside the network, but rather corresponds to the amount of data which has not been transmitted through the network yet for a specific object.

A bandwidth sharing function allocates $f(z_i)$ units of bandwidth to object $z_i$ per unit of time. For instance, if TCP is the transport protocol, one can view $f(z_i)$ as the rate achieved by the TCP session which carries $z_i$.

Given f and $B(z_i)$ for all i=1; : : : ; n−1 (where the n-th arrival is to be scheduled), the completion time for all content transfers may be estimated. It is an iterative process which looks at the next content object to terminate, namely the object j such that $B(z_j)/f(z_j) \leq B(z_i)/f(z_i)$ for all i=1; : : : ; n−1. Upon completion of $z_j$, we have a different set of objects (all the objects for which $B(z_i)>0$ minus $z_j$). Iteration is performed on all the objects such that $B(z_i)>0$ to calculate the completion time of each object. The parameter $Tv(z_i)$ denotes the completion time of $z_i$ under the allocation set V describing the path allocation of the objects $z_1$; : : : ; $z_{n-1}$.

For arrival $z_n$, there is a subset $P_{s,d}$ of all the paths $K_{s,d}$ between source s and destination d that $z_n$ can be assigned. An example technique in identifying the subset $P_{s,d}=\{P^k_{s,d}, k=1; : : : ; K_{s,d}\}$ is to use an output of Yen's k-shortest path algorithm modified to increase path diversity to obtain the set of $K_{s,d}$ shortest paths from which a choice is to be made. Denote by k the cardinality of the candidate path subset, and by $V_{Pi}$, i=1; : : : ; k the allocation set that describes the current allocation plus the potential allocation of $z_n$ to the i-th path $P_i \in \mathcal{P}_{s,d}$. For instance, $V_{P1}$ is the allocation of $z_1$; : : : ; $z_{n-1}$ to their current path with backlog $B(z_i)$ and of $z_n$ to the first path in $\mathcal{P}_{s,d}$ with backlog (or in this case, object size) $B(z_n)$. The path $P \in \mathcal{P}_{s,d}$ is selected such that:

$$\min_{P \in \mathcal{P}_{s,d}} \Sigma_{i=1}^n T_{VP}(z_i) \qquad (3)$$

that is, the path with the minimal total completion time for all objects in the system.

The Minimum Response Time Policy (MRTP) for path selection for incoming content $z_n$ originated at node a and destined for node b may be summarized as follows. For every candidate path $\mathcal{P}_{s,d}$ for each (s,d) traffic demand pair and $B(z_i)(t)$ for every content $z_i$ being transferred, i=1, . . . , n–1 with $B(z_i)(t) > 0$, select one path $P \in P_{a,b}$, $1 \le i \le K_{a,b}$ from the candidate paths and insert it to the allocation set by $V \to V + z_n \to P$. Given the bandwidth function $f(z_i)$ and remaining backlogs $B(z_i)$, calculate the expected response time $T_V(z_i)$ of each flow. Find the checkpoint time $t_{check}$ which is the minimum expected response time found by $t_{check} = \min_i T_V(z_i)$. Update the backlogs of each flow at time $t_{check}$ by $B(z_i) = (B(z_i) - t_{check} \times f(z_i))^+$. If all flows are not completely transmitted, recursively go back and calculate the response time of the non-terminated flows after the checkpoint. Update the response time of the flows by $T_V(z_i) = T_V(z_i) + t_{check}$ where $T_V(z_i)$ is the aggregate response time of flow $z_i$ for candidate allocation V. If all flows are completely transmitted, calculate the total response time of all flows as $T_V = \Sigma_{i=1}^n T_V(z_i)$. Iteratively go back and select the next candidate path until all candidate paths are selected in series. From the total response times of each candidate path scenario $T_V$'s, select the one which will give the minimum total response time. Add this path to the existing set of paths and deliver the incoming content $z_n$ on the selected path.

Minimum Response Time Policy (MRTP) requires knowledge of the backlogs $B(z_i)$ and the bandwidth sharing function $f(z_i)$. The backlog can be monitored at the edge or can be computed if the function $f(z_i)$ is known at all time. The function $f(z_i)$, Vi, can be estimated from a model of the transport layer or from an empirical measurement of the network conditions. However, to achieve the performance objectives, the function $f(z_i)$ is set by the controller in allocation of bandwidth so as to fairly share the bandwidth and minimize the completion time. Such bandwidth allocation may be practical only inside the network fabric, as the bandwidth from the network edge to the client may vary due to the user's mobility and heterogeneous access conditions. However, in ICN, this bandwidth sharing computation may be used to deliver the data to a cache at the network's edge.

A bandwidth sharing function may be performed by network monitoring unit 108 in controller 102 as follows. For all links e∈E, calculate a number of flows $p_e$ sharing each link. For each object $z_i$, find the minimum bottleneck bandwidth limitation by $BW_{min,zi} = \min_{e \in Pzi} c_e/p_e$. Find the minimum bandwidth limitation among all flows by $BW_{bott} = \min_i BW_{min,zi}$. For any flow that satisfies $BW_{min,zi} = BW_{bott}$, assign $BW_{bott}$ bandwidth to that flow. After bandwidth assignments, the link capacities are updated and the assigned flows are removed the list. If there are still flows that wait for bandwidth assignment, then the bandwidth sharing function goes back and iterates for each pending flow. Once all flows have been processed, the bandwidth assignments are provided by network monitoring unit 108 to allocation algorithm unit 110 for path selection.

A Java simulator can be used to evaluate the response time performance of the proposed MRTP against minMLU, MBP, and round robin format (RRF). The technical details of minMLU and MBP can be found at K. Su and C. Westphal, "On the benefit of information centric networks for traffic engineering", IEEE ICC Conference, June 2014. In round-robin format, every source-destination pair has a set of $K_{s,d}$ paths. These paths are selected in a round-robin format every time a new flow comes in to the network between these two nodes. For each simulation setup, an evaluation between the proposed MRTP and conventional allocation techniques is performed on two different networks and several different traffic models and parameters. The bandwidth sharing function is used in the following evaluation, as the performance of minMLU with this bandwidth sharing is always better than the performance allocation of minMLU with TCP. Therefore, by comparing the MRTP algorithm with minMLU and this bandwidth sharing, the gain of MRTP is understated against minMLU and TCP.

Figure 4:
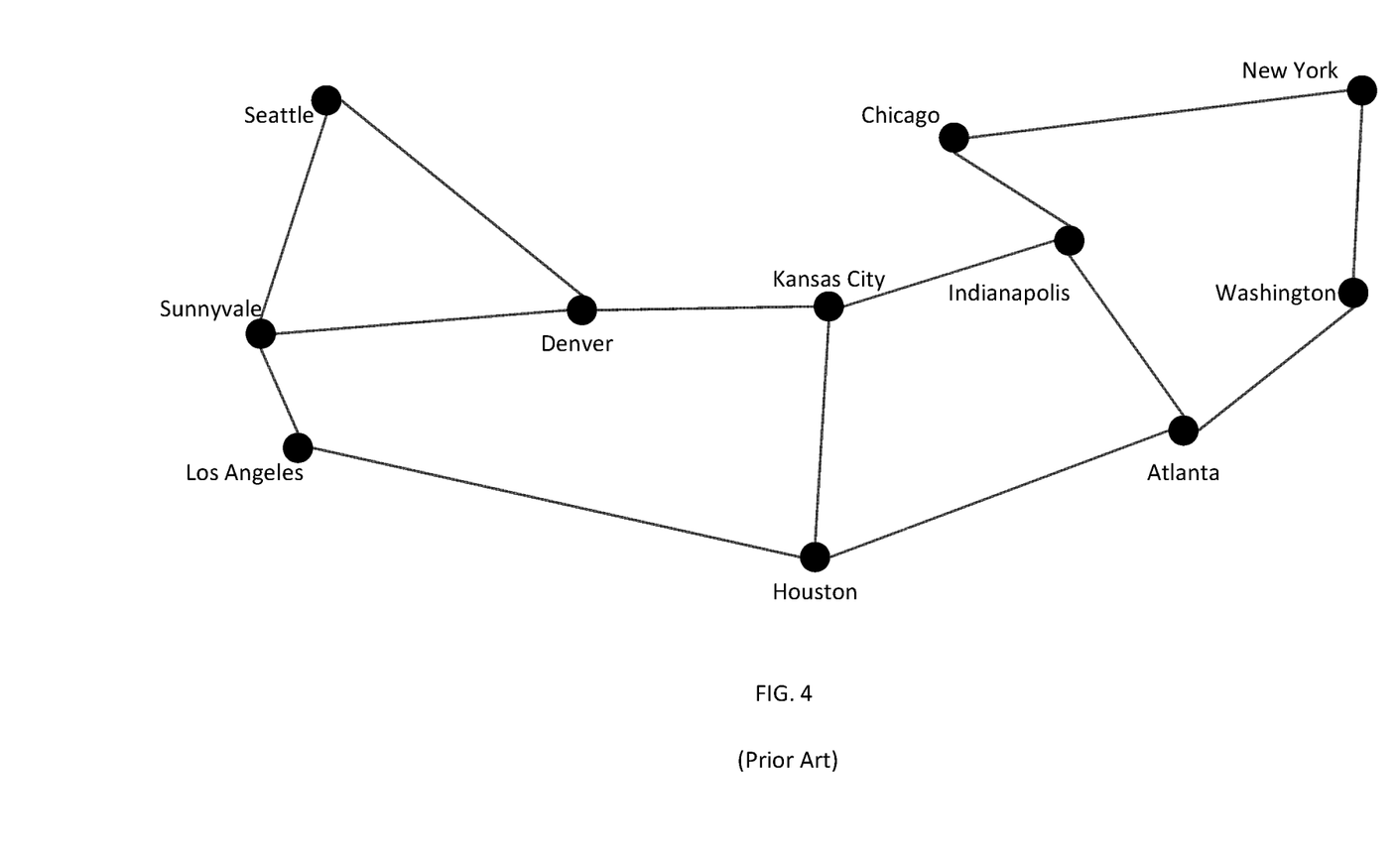
FIG. 4 illustrates a first network type used in comparing the path selection process to conventional techniques.

FIG. 4 depicts a first network type used in the evaluation. The first network type is an Abilene (WAN) network, a backbone network established by the Internet2 group, which has 11 nodes and 14 edges. The capacity for each link is 9920 Mbps, except the link between the nodes in Indianapolis and Atlanta where the capacity is 2480 Mbps. Three candidate paths for each source-destination node pair is computed based on OSPF link weights given by B. Fortz and M. Thorup, "Internet traffic engineering by optimizing OSPF weights", INFOCOM 2000, Nineteenth Annual Joint Conference of the IEEE Computer and Communications Societies, Proceedings, IEEE, volume 2, pages 519-528 vol. 2, 2000, and Yen's algorithm. Different traffic demand matrices are used to characterize the traffic inputs. They are uniform, gravity-based and a realistic model from Y. Zhang, Abilene traffic matrices, http://www.cs.utexas.edu/yzhang/research/AbileneTM/. The realistic matrix was built by measuring the end to end traffic for each source-destination pair in the Abilene network, for a period of 5 minutes. The traffic input is created by using Pareto distribution and Poisson process for the object sizes and arrival times, respectively. Pareto parameters $\chi_m$ and $\alpha$ and Poisson parameter $\lambda$ are varied in different simulations to measure the performance in various traffic scenarios.

Figure 5:
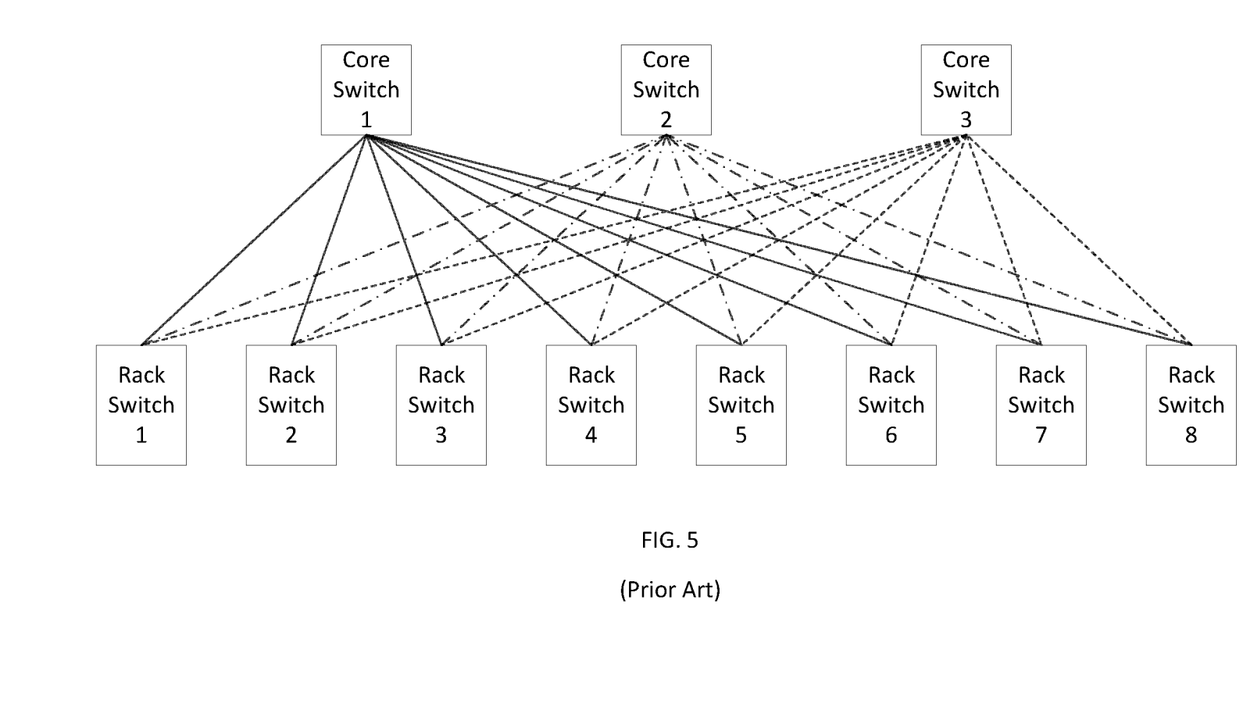
FIG. 5 illustrates a second network type used in comparing the path selection process to conventional techniques.

FIG. 5 depicts a second network type used in the evaluation. The second network type is a data center (DC) network including 8 rack switches and 3 core switches, which make a combined 11 nodes. The network is fully bipartite connected, meaning there is a link between each rack and core switch. A uniform traffic demand matrix is assumed between each rack switch in the DC network. There are 3 disjoint and equal cost paths between each rack switch pair. Those paths have a length of 2 hops going over one of the core switches.

As mentioned above, network simulators are used, alternative Java simulators. In both of the simulations, the goal is to measure the average response time of a set of traffic inputs and compare the results for different algorithms. The response time of content is the difference between the arrival of the acknowledgement for the last packet of the content and the arrival of the first one.

Figure 6:
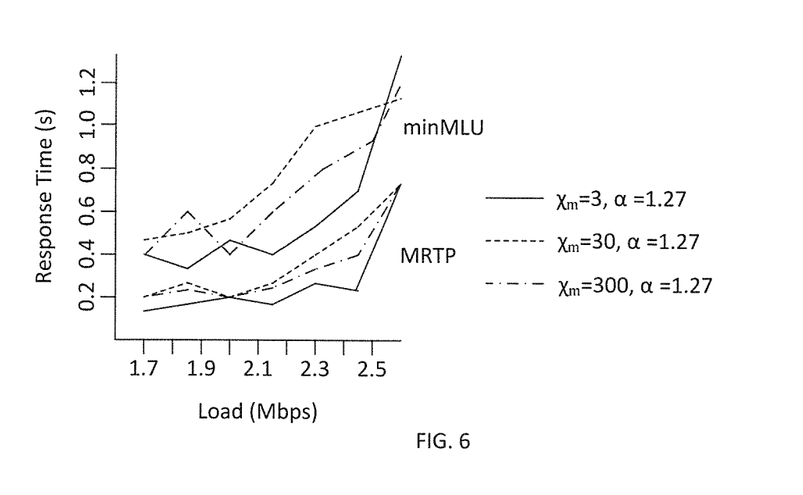
FIG. 6 illustrates a graph comparing the path selection process to a particular conventional technique in the first network type having a first traffic demand.

FIG. 6 shows response time results for MRTP and min-MLU using a first Java simulation scenario in the Abilene (WAN) network based on the traffic demand taken from Y. Zhang, Abilene traffic matrices, http://www.cs.utexas.edu/yzhang/research/AbileneTM/. To create different traffic inputs, three different values 3, 30, and 300 for $\chi_m$ are applied. The flow arrival rate ($\lambda$) is varied between 12 and 18 for $\chi_m$=300, between 120 and 180 for $\chi_m$=30, and between 1200 and 1800 for $\chi_m$=3. The traffic load is calculated using formula $$Trafficload = \lambda \times \chi_m \times \frac{\alpha}{\alpha - 1};$$

which corresponds to between 60% and 100% link utilization with that specific value. The 100% link utilization in this network for this traffic matrix is satisfied with a traffic load of 25084 Mbps. Note that the response time measurements of the cases in which $\chi_m$=30 and $\chi_m$=3 are scaled by 10 and 100 to fit all three simulation scenarios into the same graph. According to the results, MRTP reduces the mean response time approximately 40% compared to minMLU.

Figure 7:
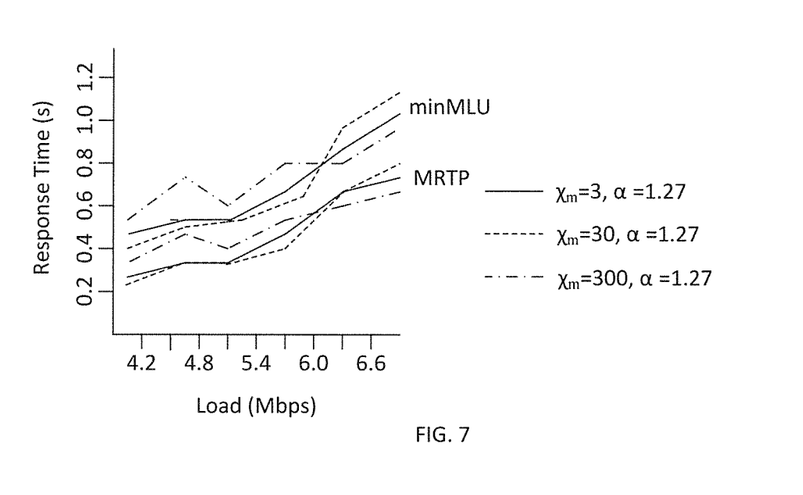
FIG. 7 illustrates a graph comparing the path selection process to a particular conventional technique in the first network type having a second traffic demand.

FIG. 7 shows response time results for MRTP and minMLU using a second Java simulation in the Abilene (WAN) network but with a gravity-based traffic demand. Under this model, it requires a traffic load of 65140 Mbps to achieve 100% link utilization therefore the arrival rate parameter $\lambda$ is updated to achieve link utilization between 60% and 100% link utilization. Parameter $\lambda$ is set between 3000 and 4800 for $\chi_m$=3, between 300 and 480 for $\chi_m$=30, and between 30 and 48 for $\chi_m$=300. Note that, as before, the response time measurements of the cases in which $\chi_m$=30 and $\chi_m$=3 are scaled by 10 and 100 to fit all three simulation scenarios into the same graph. The simulation results show an approximately 30% reduction in response time by MRTP compared to minMLU.

Figure 8:
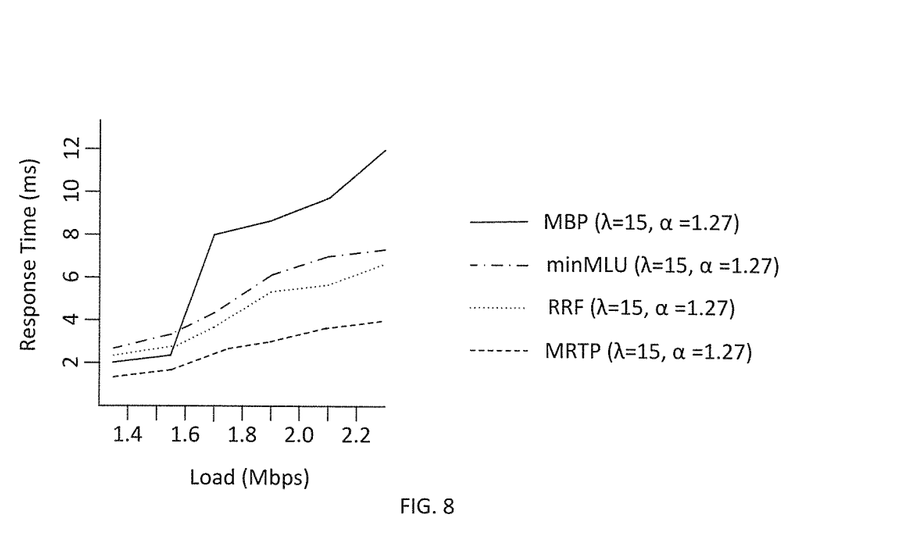
FIG. 8 illustrates a graph comparing the path selection process to various conventional techniques in the second network type having a first flow arrival rate.
Figure 9:
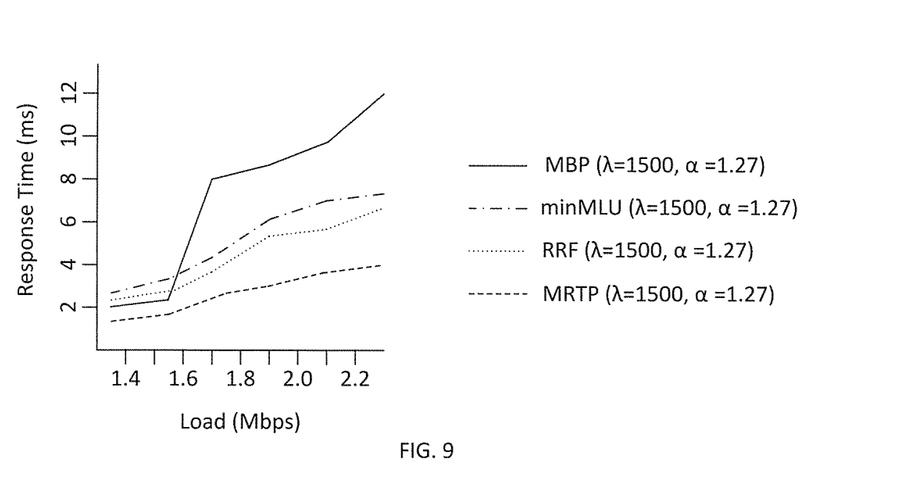
FIG. 9 illustrates a graph comparing the path selection process to various conventional techniques in the second network type having a second flow arrival rate.

FIGS. 8 and 9 show response time results using a Java simulation in a DC network with a uniform traffic demand matrix. In addition to MRTP and minMLU, MBP and RRF are also included in the simulation. As in the WAN simulations, the traffic input parameters are arranged such that they correspond to between 60% and 100% link utilization. DC network requires a traffic load of 229151 Mbps to achieve 100% link utilization under uniform traffic model. For $\lambda$=15, $\chi_m$ is set between 2000 and 3250 and for $\chi$=1500, $\chi_m$ is set between 20 and 32.5. FIG. 8 shows the response time calculations of four different techniques for the traffic input with $\lambda$=15. FIG. 9 shows the response time calculations of four different techniques for the traffic input with $\lambda$=1500. In both graphs, MRTP significantly outperforms the other techniques. It reduces the response time approximately 40% and 45% compared to minMLU and RRF. MBP policy performs second best in the low utilization regime but its performance deteriorates in the high utilization regime.

Figure 10:
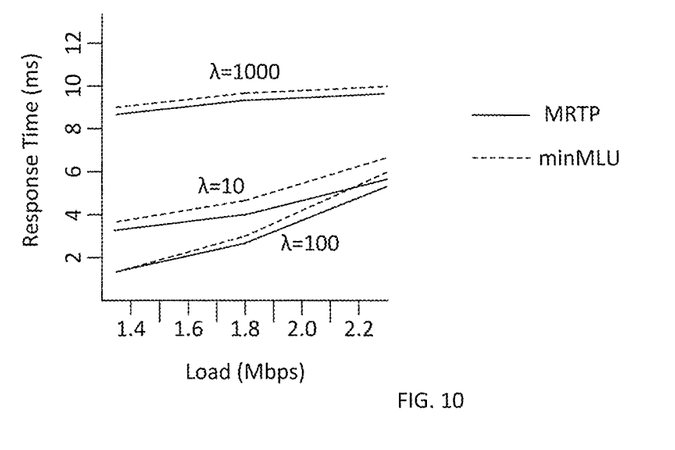
FIG. 10 illustrates a graph showing the effect of bandwidth assignment on the path selection process and the particular conventional technique at different flow arrival rates.

FIG. 10 shows response time results for MRTP and minMLU using a Java simulation scenario to see the effect of bandwidth assignment policy on response time reductions. For the Java simulation, the maximum bandwidth allocated to any flow is set to 1000 Mbps. The traffic input is created based on the traffic demand taken from Y. Zhang, Abilene traffic matrices, http://www.cs.utexas.edu/yzhang/research/AbileneTM/. The $\lambda$ parameters are set to 10, 100, and 1000 and $\chi_m$ values are set accordingly to achieve link utilization between 60% and 100%. It is clear from the response time results that the benefit of MRTP shrinks when there is a limit on bandwidth. As a result, bandwidth allocation performed by the controller produces improved response time results.

As shown above, a significant gain in response time is achieved with somewhat greater cost of complexity within the controller. However, any additional cost of complexity in implementing the features discussed herein within the controller is outweighed by gains and efficiency of fine grained resource allocation.

Since all new objects invoke the controller, the scalability of the method can be improved. For instance, using a threshold to monitor only elephant flows would reduce the number of scheduling decisions. Short flows can be missallocated without significant penalty.

The algorithm measures the total response time, but this could be modified to include other objectives. For instance, one could normalize the response time by the size of the flow so as not to penalize short flows. Other performance objectives can be computed for the path selection.

The bandwidth estimation mechanism can be optimized as well. For instance, for a network that operates in a steady state, learning methods could allow the network controller to assess the performance of specific flows based upon previous operations. A proper resource allocation should also allocate the bandwidth, and the transport layer is evolved to support this bandwidth allocation.

Figure 11:
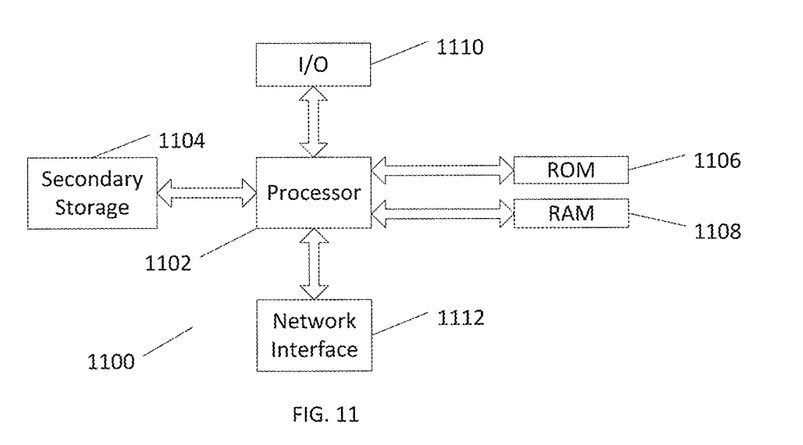
FIG. 11 illustrates a simplified example of a general-purpose computing component suitable for entities in the network to perform in the path selection process.

FIG. 11 illustrates a simplified example of a general-purpose computing component 1100 suitable for implementing one or more embodiments disclosed herein. The components described above for controller 102 and node/switch 104 may be implemented on any general-purpose computing component, such as a computer or network component with sufficient processing power, memory resources, and network throughput capability to handle the necessary workload placed upon it. In addition, the features of content management unit 106, network monitoring unit 108, and allocation algorithm unit 110 may be implemented on any one or more general-purpose computing components, such as a computer or network component with sufficient processing power, memory resources, and network throughput capability to handle the necessary workload placed upon it. The computing component 1100 includes a processor 1102 (which may be referred to as a central processor unit or CPU) that is in communication with memory devices including secondary storage 1104, read only memory (ROM) 1106, random access memory (RAM) 1108, input/output (I/O) devices 1110, and network/component connectivity devices 1112. The processor 1102 may be implemented as one or more CPU chips, or may be part of one or more application specific integrated circuits (ASICs).

The secondary storage 1104 is typically comprised of one or more disk drives or tape drives and is used for non-volatile storage of data and as an over-flow data storage device if RAM 1108 is not large enough to hold all working data. Secondary storage 1104 may be used to store programs that are loaded into RAM 1108 when such programs are selected for execution. The ROM 1106 is used to store instructions and perhaps data that are read during program execution. ROM 1106 is a non-volatile memory device that typically has a small memory capacity relative to the larger memory capacity of secondary storage 1104. The RAM 1108 is used to store volatile data and perhaps to store instructions. Access to both ROM 1106 and RAM 1108 is typically faster than to secondary storage 1104. Additional processors and memory devices may be incorporated based on the function of each component within controller 102, node/switch 104, content management unit 106, network monitoring unit 108, and allocation algorithm unit 110.

In summary, a traffic engineering architecture and an allocation algorithm is presented that takes advantage of the abstractions of information-centric networks to perform a fine grained resource allocation at the content level. Unlike IP, ICN offers the proper abstraction to increase the efficiency of the network resources and to reduce the response time of the network. ICN offers an opportunity to re-think traffic engineering, by allowing resource scheduling at the granularity of content. An architecture for performing content-based resource allocation includes assigning content objects to paths in the networks by considering the time it will take to deliver the content object and optimizing the allocation with respect to minimizing the delivery time in relation to other content object delivery.

A controller can compute an estimated response time for a set of candidate paths and that even a relatively small set of such candidate paths can produce significant gains in response time. The controller incorporates a MRTP policy which allocates traffic to paths such that the total response time of the flows in the network is minimized. This is based upon an estimation of the bandwidth for each flow, which can either be estimated or controlled by the controller. Bandwidth control by the controller provides an efficient way to allocate the resources and a bandwidth sharing function is implemented to achieve objectives of fairness and performance.

Significant gains in response time are achieved with the described architecture when compared with previous proposals, including the traffic engineering policy which minimizes the maximum link utilization (minMLU). The MRTP evaluated over multiple network topologies and network conditions significantly improves the network's response time for a wide range of network utilization and for different traffic size distributions. Reduced delay is achieved in all cases with up to 50% improvement in response time over min-MLU in some evaluation scenarios.

In some embodiments, some or all of the functions or processes of the one or more of the devices are implemented or supported by a computer program that is formed from computer readable program code and that is embodied in a computer readable medium. The phrase "code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The terms "include" and "comprise," as well as derivatives thereof, mean inclusion without limitation. The term "or" is inclusive, meaning and/or. The phrases "associated with" and "associated therewith," as well as derivatives thereof, mean to include, be included within, interconnect with, contain, be contained within, connect to or with, couple to or with, be communicable with, cooperate with, interleave, juxtapose, be proximate to, be bound to or with, have, have a property of, or the like.

While this disclosure has described certain embodiments and generally associated methods, alterations and permutations of these embodiments and methods will be apparent to and readily discernable by those skilled in the art. Accordingly, the above description of example embodiments does not define or constrain this disclosure. Other changes, substitutions, and alterations are also possible without departing from the scope of this disclosure as defined by the following claims.

What is claimed is:

1. A computer-implemented method for reducing response times in an information-centric network, the method comprising:
    receiving an indication from an ingress node of a content object entering a network, the content object associated with a new delivery flow through the network;
    identifying an egress node in the network for the content object;
    identifying a size of the content object;
    determining a backlog and bandwidth for the new delivery flow based in part on the size of the content object;
    determining backlogs and bandwidths for existing delivery flows in the network;
    determining a set of candidate paths in the network for the new delivery flow from the ingress node to the egress node;
    estimating a total response time for completion of all delivery flows for each candidate path based on the backlog and bandwidth; and
    selecting one of the candidate paths having a lowest total response time for the new delivery flow.

2. The computer-implemented method of claim 1, wherein the estimating the total response time includes:
    identifying a time when a particular one of the existing delivery flows is completed; and
    updating the total response time and backlogs upon completion of the particular one of the existing delivery flows.

3. The computer-implemented method of claim 2, further comprising:
    determining whether any backlog is present; and
    providing the total response time upon determining that no backlogs are present.

4. The method of claim 2, further comprising:
    determining whether any backlog is present; and
    processing the existing delivery flows until no backlogs are present.

5. The computer-implemented method of claim 1, further comprising:
    comparing the size of the content object to a threshold; and
    determining the set of candidate paths to generate the total response times in response to the size of the content object exceeding the threshold value.

6. The computer-implemented method of claim 1, wherein the network is an information-centric network.

7. The computer implemented method of claim 1, wherein the estimating the total response time for completion of all delivery flows includes estimating a total response time for completion of all delivery flows for delivery of the new delivery flow for each candidate path based on the backlog and bandwidth for the new delivery flow and the backlogs and bandwidths for existing delivery flows in the network.

8. A device for reducing response times in an information-centric network, comprising:
    a non-transitory memory storage comprising instructions; and
    one or more processors in communication with the memory, wherein the one or more processors execute the instructions to:
        receive an indication from an ingress node of a content object entering a network, the content object associated with a new delivery flow through the network;
        identify an egress node in the network for the content object;
        identify a size of the content object;

determine a backlog and bandwidth for the new delivery flow based in part on the size of the content object;
determine backlogs and bandwidths for existing delivery flows in the network;
determine a set of candidate paths in the network for the new delivery flow from the ingress node to the egress node;
estimate a total response time for completion of all delivery flows for each candidate path based on the backlog and bandwidth; and
select one of the candidate paths for the new delivery flow having a lowest total response time.

9. The device of claim 8, wherein the one or more processors in executing the instructions to estimate the total response time, execute the instructions to:
identify a time when a particular one of the existing delivery flows is completed; and
update the total response time and backlogs upon completion of the particular one of the existing delivery flows.

10. The device of claim 9, further comprising the one or more processors executing the instructions to:
determine whether any backlog is present; and
provide the total response time upon determining that no backlogs are present.

11. The device of claim 9, further comprising the one or more processors executing the instructions to:
determine whether any backlog is present; and
process the existing delivery flows until no backlogs are present.

12. The device of claim 8, further comprising the one or more processors executing the instructions to:
compare the size of the content object to a threshold; and
determine the set of candidate paths generate the total response times in response to the size of the content object exceeding the threshold value.

13. The device of claim 8, wherein the network is an information-centric network.

14. The device of claim 8, wherein the one or more processors in executing the instructions to estimate the total response time, execute the instructions to:
estimate a total response time for completion of all delivery flows for delivery of the new delivery flow for each candidate path based on the backlog and bandwidth for the new delivery flow and the backlogs and bandwidths for existing delivery flows in the network.

15. A non-transitory computer readable medium storing computer instructions for reducing response times in an information-centric network, that when executed by one or more processors, cause the one or more processors to perform the step of:
receive an indication from an ingress node of a content object entering a network, the content object associated with a new delivery flow through the network;
identify an egress node in the network for the content object;
identify a size of the content object;
determine a backlog and bandwidth for the new delivery flow based in part on the size of the content object;
determine backlogs and bandwidths for existing delivery flows in the network;
determine a set of candidate paths in the network for the new delivery flow from the ingress node to the egress node;
estimate a total response time for completion of all delivery flows for each candidate path based on the backlog and bandwidth; and
select one of the candidate paths for the new delivery flow having a lowest total response time.

16. The non-transitory computer readable medium of claim 15, wherein the computer instructions to cause the one or more processors to perform the steps of estimating the total response time, further comprising computer instructions, that when executed by one or more processors, cause the one or more processors to perform the steps of:
identify a time when a particular one of the existing delivery flows is completed; and
update the total response time and backlogs upon completion of the particular one of the existing delivery flows.

17. The non-transitory computer readable medium method of claim 16, and further comprising computer instructions, that when executed by one or more processors, cause the one or more processors to perform the steps of:
determine whether any backlog is present; and
provide the total response time upon determining that no backlogs are present.

18. The non-transitory computer readable medium of claim 16, further comprising computer instructions, that when executed by one or more processors, cause the one or more processors to perform the steps of:
determine whether any backlog is present; and
process the existing delivery flows until no backlogs are present.

19. The non-transitory computer readable medium of claim 15, further comprising computer instructions, that when executed by one or more processors, cause the one or more processors to perform the steps of:
compare the size of the content object to a threshold; and
determine the set of candidate paths generate the total response times in response to the size of the content object exceeding the threshold value.

20. The non-transitory computer readable medium of claim 15, wherein the network is an information-centric network.

* * * * *